United States Patent
Lu et al.

(10) Patent No.: US 9,414,428 B2
(45) Date of Patent: Aug. 9, 2016

(54) METHODS IN A DEVICE-TO-DEVICE, D2D, ENABLED USER EQUIPMENT, A D2D ENABLED USER EQUIPMENT, METHODS IN A BASE STATION, A BASE STATION, COMPUTER PROGRAMS AND COMPUTER PROGRAM PRODUCTS

(75) Inventors: Qianxi Lu, Beijing (CN); Yang Hu, Beijing (CN); Qingyu Miao, Beijing (CN); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 14/356,828

(22) PCT Filed: Nov. 8, 2011

(86) PCT No.: PCT/CN2011/081928
§ 371 (c)(1),
(2), (4) Date: May 7, 2014

(87) PCT Pub. No.: WO2013/067685
PCT Pub. Date: May 16, 2013

(65) Prior Publication Data
US 2014/0315541 A1    Oct. 23, 2014

(51) Int. Cl.
| | |
|---|---|
| H04W 76/04 | (2009.01) |
| H04W 76/02 | (2009.01) |
| H04W 24/10 | (2009.01) |
| H04W 88/06 | (2009.01) |
| H04L 5/00 | (2006.01) |

(52) U.S. Cl.
CPC ............ *H04W 76/043* (2013.01); *H04W 24/10* (2013.01); *H04W 76/023* (2013.01); *H04L 5/0051* (2013.01); *H04W 88/06* (2013.01)

(58) Field of Classification Search
CPC ............................ H04W 76/023; H04W 92/18
See application file for complete search history.

(56) References Cited

U.S. PATENT DOCUMENTS

| 2006/0239230 A1* | 10/2006 | Nakano ................ H04W 36/22 370/331 |
| 2010/0165882 A1* | 7/2010 | Palanki ............... H04W 76/023 370/254 |
| 2010/0240373 A1* | 9/2010 | Ji .......................... H04W 36/08 455/436 |

FOREIGN PATENT DOCUMENTS

| CN | 102090132 A | 6/2011 |
| EP | 2012441 A1 | 1/2009 |

(Continued)

*Primary Examiner* — Khalid Shaheed
*Assistant Examiner* — Ernest Tacsik
(74) *Attorney, Agent, or Firm* — Murphy, Bilak & Homiller, PLLC

(57) ABSTRACT

The invention relates to a method (20) in a device-to-device, D2D, enabled user equipment (12) of a communication system (10). The D2D enabled user equipment (12) supports D2D-communication with another D2D-enabled user equipment (15). The communication system (10) comprises a base station (15) serving one or more cellular user equipment (14) unable to support D2D communication. The D2D enabled user equipment (2, 15) and the cellular user equipment (14) share the same communication resources. The method (20) comprises: receiving (21), from the base station (13), configuration parameters comprising information on a reference signal pattern for use by the D2D enabled user equipment (12), and transmitting (22), based on the configuration parameters, cellular reference signals, enabling the cellular user equipment (14) to measure and report, to the base station (13), channel information on a channel from the D2D enabled user equipment (12) to the cellular user equipment (14). The invention also relates to D2D user equipment, methods in a base station, base station, computer programs and computer program products.

8 Claims, 4 Drawing Sheets

(56) References Cited

FOREIGN PATENT DOCUMENTS

| WO | 2010102668 | A1 | 9/2010 |
| WO | 2010125427 | A1 | 11/2010 |
| WO | 2011050519 | A1 | 5/2011 |
| WO | 2011088609 | A1 | 7/2011 |

* cited by examiner

METHODS IN A DEVICE-TO-DEVICE, D2D, ENABLED USER EQUIPMENT, A D2D ENABLED USER EQUIPMENT, METHODS IN A BASE STATION, A BASE STATION, COMPUTER PROGRAMS AND COMPUTER PROGRAM PRODUCTS

TECHNICAL FIELD

The technology disclosed herein relates generally to the field of wireless communication systems, and in particular to interference measurements within such wireless communication systems.

BACKGROUND

Wireless communication systems are under constant development and continuing efforts are made to increase the performance and efficiency within such systems. In view of this, a promising feature of future wireless communication systems comprises direct communication between user equipment in close proximity of each other, e.g. within a distance of a few tens or hundred meters. In future mixed networks, a user equipment may be in a direct device-to-device (D2D) mode in addition to a cellular mode. The D2D mode enables a number of potential gains over the traditional cellular technique, for example capacity gains, peak rate gains and latency gains.

Using 3GPP LTE (Long Term Evolution) as an example, the D2D communication is set forth as an underlay to LTE cellular network operation, wherein both the cellular communication and the D2D communication use the same communication resources. In the D2D mode the user equipment communicates directly with another user equipment, and in the cellular mode it communicates with the other user equipment via a base station in conventional manner.

FIG. 1 illustrates a mixed communication network 1, supporting user equipment being in the cellular mode as well as the D2D mode. In a typical scenario, a first user equipment 2 in D2D mode (in the following denoted first D2D user equipment 2) receives D2D configuration information from a base station 3. The configuration information comprises e.g. D2D transmit power and/or resource allocation.

A user equipment 4 in the cellular mode (in the following denoted cellular user equipment 4) experiences interference due to a D2D communication between the first and a second user equipment 5 in D2D mode (in the following denoted second D2D user equipment 5). The cellular user equipment 4 also receives D2D configuration information. The cellular user equipment 4 then receives a request from the base station 3 to measure on the D2D transmission between the first D2D user equipment 2 and the second D2D user equipment 5. In particular, the base station 3 requests the cellular user equipment 4 to monitor the control signaling between the first and second D2D user equipment 2, 5. The cellular user equipment 4 reports measurement results, e.g. interference channel information, to the base station 3. The base station 3 may then use the measurement results in various ways for increasing the overall performance in the communication network 1, e.g. for minimizing interference.

Knowledge about characteristics and parameters of channels between two communicating D2D user equipment and channels between the base station and the cellular user equipment is important for many reasons, e.g. for mode selection, scheduling, power control mechanisms, for minimizing intra-cell interference etc. For example, since the D2D users and the cellular user equipment communicate on the same set of resources (spectrum), interference measurements are important.

However, legacy user equipment, e.g. LTE Rel-8, 9 and 10, does not support the above described measurement and reporting. The measurement reports on the D2D communication would then be provided solely by user equipment supporting both modes. The legacy user equipment and the future user equipment supporting D2D as well as cellular communication will, as mentioned, share/use the same communication resources and measurement reports, e.g. cross channel measurements, from all user equipment would be valuable.

SUMMARY

An object of the invention is to obviate the above mentioned problem. The object is according to a first aspect of the invention achieved by a method in a device-to-device, D2D, enabled user equipment of a communication system. The D2D enabled user equipment supports D2D communication with another D2D enabled user equipment and the communication system comprises a base station serving one or more cellular user equipment unable to support D2D communication. The D2D enabled user equipment and the cellular user equipment share the same communication resources. The method comprises: receiving, from the base station, configuration parameters comprising information on a reference signal pattern for use by the D2D enabled user equipment, and transmitting, based on the configuration parameters, cellular reference signals, enabling the cellular user equipment to measure and report, to the base station, channel information on a channel from the D2D enabled user equipment to the cellular user equipment.

The method enables legacy user equipment, having no D2D mode capability, to measure and report on channel characteristics in a mixed mode wireless communication system. The method is transparent for the cellular user equipment, as it measures on cellular reference signals from the D2D enabled user equipment and possibly also from the base station.

In an embodiment, the configuration parameters comprise information on a reference signal pattern used by the base station, and the D2D user equipment transmits the cellular reference signals in lieu of the base station.

In an embodiment, the configuration parameters comprise information on a reference signal pattern different than a reference signal pattern used by the base station, whereby the D2D enabled user equipment transmits cellular reference signals with a reference signal pattern different than the reference signal pattern used by the base station. This enables the cellular user equipment to measure and report to the base station channel information based on two different cellular reference signals.

In an embodiment, the cellular reference signals comprise channel state information reference signals, dedicated reference signals, or broadcast reference signals. Various kinds of cellular reference signaling can thus be used.

The object is according to a second aspect of the invention achieved by a device-to-device, D2D, enabled user equipment. The D2D enabled user equipment supports D2D communication with another D2D enabled user equipment in a communication system comprising a base station serving one or more cellular user equipment unable to support D2D communication. The D2D enabled user equipment and the cellular user equipment share the same communication resources. The D2D enabled user equipment comprises: a receiver arranged to receive, from the base station, configuration parameters comprising information on a reference signal pattern for use by the D2D enabled user equipment, and a transmitter arranged to transmit, based on the configuration parameters, cellular reference signals, enabling the cellular user equipment to measure and report, to the base station, channel information on a channel from the D2D enabled user equipment to the cellular user equipment.

The object is according to a third aspect of the invention achieved by a computer program for a device-to-device, D2D, enabled user equipment. The D2D enabled user equipment supports D2D communication with another D2D enabled user equipment in a communication system comprising a base station serving one or more cellular user equipment unable to support D2D communication. The D2D enabled user equipment and the cellular user equipment share the same communication resources. The computer program comprises computer program code, which, when run on the D2D enabled user equipment, causes the D2D enabled user equipment to perform the steps of: receiving, from the base station, configuration parameters comprising information on a reference signal pattern for use by the D2D enabled user equipment, and transmitting, based on the configuration parameters, cellular reference signals, enabling the cellular user equipment to measure and report to the base station channel information on a channel from the D2D enabled user equipment to the cellular user equipment.

The object is according to a fourth aspect of the invention achieved by a computer program product comprising a computer program as above and a computer readable means on which the computer program is stored.

The object is according to a fifth aspect of the invention achieved by a method in a base station of a communication system. The communication system comprises a D2D enabled user equipment supporting D2D communication with another D2D enabled user equipment and one or more cellular user equipment unable to support D2D communication. The D2D enabled user equipment and the cellular user equipment share the same communication resources. The method comprises: transmitting, to the D2D enabled user equipment, configuration parameters comprising information on a first reference signal pattern for use by the D2D enabled user equipment, requesting, from the cellular user equipment, a measurement report based on cellular reference signals transmitted by the D2D enabled user equipment using the first reference signal pattern, and receiving, from the cellular user equipment, measurement reports based on the cellular reference signals transmitted from the D2D enabled user equipment, the measurement report comprising channel information on channel from the D2D enabled user equipment to the cellular user equipment.

In an embodiment, the method comprises: transmitting, to the cellular user equipment reference signals using a second reference signal pattern, requesting, from the cellular user equipment, a measurement report based on cellular reference signals from the second reference signal pattern, and receiving, in response to the requesting, from the cellular user equipment measurement reports on channel from the base station to the cellular user equipment.

In an embodiment, the base station utilizes the first reference signal pattern and the method comprises muting reference signal transmissions from the base station using the first reference signal pattern, when the D2D enabled user equipment transmits cellular reference signals using the first reference signal pattern.

The object is according to a sixth aspect of the invention achieved by a base station for use in a communication system. The communication system comprises a D2D enabled user equipment supporting D2D communication with another D2D enabled user equipment and one or more cellular user equipment unable to support D2D communication. The D2D enabled user equipment and the cellular user equipment share the same communication resources. The base station comprises: a transmitter arranged to transmit, to the D2D enabled user equipment, configuration parameters comprising information on a first reference signal pattern for use by the D2D enabled user equipment, a processor arranged to request, from the cellular user equipment, a measurement report based on cellular reference signals transmitted by the D2D enabled user equipment using the first reference signal pattern, and a receiver arranged to receive, from the cellular user equipment measurement reports based on the cellular reference signals transmitted from the D2D enabled user equipment, the measurement report comprising channel information on channel from the D2D enabled user equipment to the cellular user equipment.

The object is according to an eight aspect of the invention achieved by a computer program in a base station for use in a communication system. The communication system comprises a D2D enabled user equipment supporting D2D communication with another D2D enabled user equipment and one or more cellular user equipment unable to support D2D communication. The D2D enabled user equipment and the cellular user equipment share the same communication resources. The computer program comprises computer program code, which, when run on the base station, causes the base station to perform the steps of: transmitting, to the D2D enabled user equipment, configuration parameters comprising information on a first reference signal pattern for use by the D2D enabled user equipment, requesting, from the cellular user equipment, a measurement report based on cellular reference signals transmitted by the D2D enabled user equipment using the first reference signal pattern, and receiving, from the cellular user equipment measurement reports based on the cellular reference signals transmitted from the D2D enabled user equipment, the measurement report comprising channel information on channel from the D2D enabled user equipment to the cellular user equipment.

The object is according to a ninth aspect of the invention achieved by a computer program product comprising a computer program as above, and a computer readable means on which the computer program is stored.

Further features and advantages of the invention will become clear upon reading the following description and the accompanying drawings.

DETAILED DESCRIPTION

Figure 1:
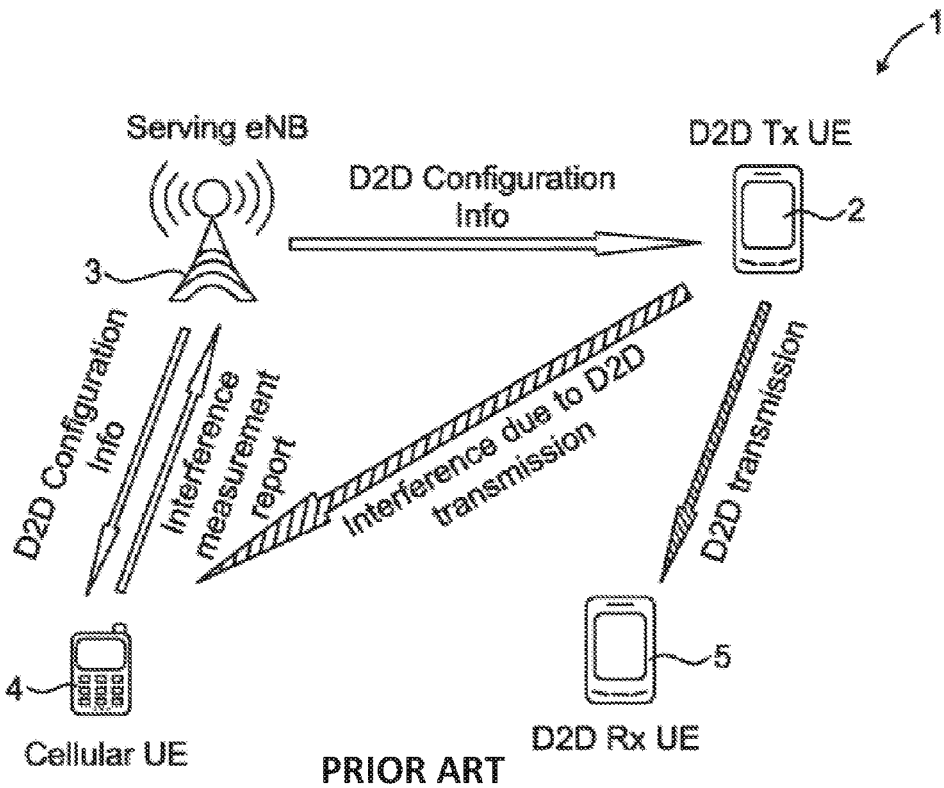
FIG. 1 illustrates a prior art situation in a device-to-device enabled communication system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
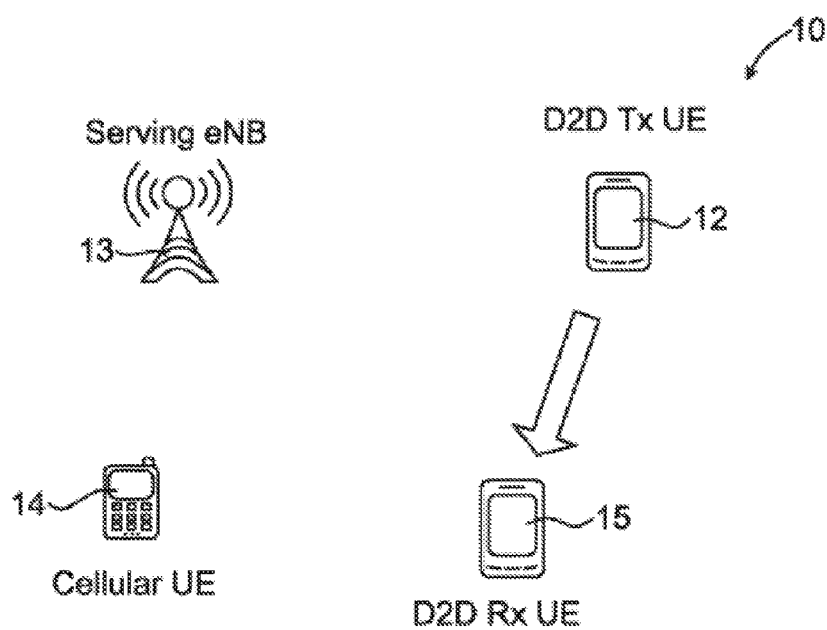
FIG. 2 illustrates schematically an environment in which embodiments of the invention may be implemented.

FIG. 2 illustrates schematically an environment in which embodiments of the invention may be implemented. In particular, a wireless communication system 10 is illustrated comprising a base station 13, e.g. evolved Node B in LTE, also denoted eNB, arranged to communicate with user equipment 12, 14, 15 using radio frequency transmitter(s) and receiver(s). The wireless communication system 10 is a mixed network, meaning that regular cellular communication as well as device-to-device, D2D, communication is supported. The base station 13 allocates the same communication resources to both these types of communication.

In the example illustrated in FIG. 2, a first user equipment 12 is a dual mode user equipment. That is, the first user equipment 12 is able to communicate in the regular cellular communication mode and in the D2D communication mode. A second user equipment 15 able to communicate in the regular cellular communication mode and in the D2D communication mode is also illustrated.

The first D2D enabled user equipment 12 will be denoted D2D transmitting user equipment, D2D Tx UE 12 for short, in the following description. The second D2D enabled user equipment 15 will be denoted D2D receiving user equipment, D2D Rx UE 15 for short, in the following description. The Tx and Rx denotations clarify that the user equipment are the transmitting part and receiving part, respectively. That is, in the D2D communication mode, in which the user equipment 12, 15 communicate directly with one another, the D2D Tx UE 12 transmits, while the D2D Rx UE 15 receives. It is however noted that they are both able to transmit and receive signaling.

The wireless communication system 10 further comprises one or more cellular user equipment 14, in the following denoted cellular UE 14, that is unable to support D2D communication, but which is supported by the base station 13 for regular cellular communication, i.e. wherein the user equipment 14 communicates in conventional manner via the base station 13 with another user equipment. Such other user equipment may be a user equipment comprising a cellular mode and/or a D2D mode.

Figure 3:
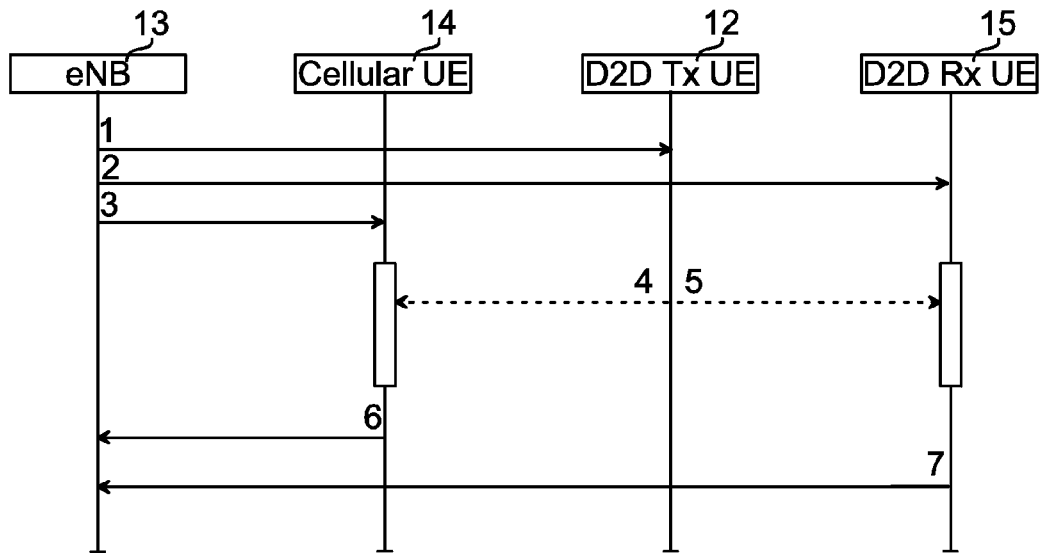
FIG. 3 is a sequence diagram illustrating first exemplary interference channel signaling in a wireless communication system.

FIG. 3 is a sequence diagram illustrating first exemplary interference channel signaling in the wireless communication system 10 of FIG. 2. In correspondence with what was described in the background section, the D2D Tx UE 12 and the D2D Rx UE 15 receive D2D configuration information from the base station 13. The configuration information comprises e.g. D2D transmit power and/or resource allocation (not illustrated). The D2D Tx UE 12 and the D2D Rx UE 15 use this configuration information for their communication.

The base station 13 signals configuration parameters of Channel State Information—Reference Signals (CSI-RS), e.g. a CSI-RS pattern and time length thereof, to the D2D Tx UE 12 and the D2D Rx UE 15 (arrows 1 and 2).

The base station 13 signals cellular configuration parameters to the cellular UE 14 (arrow 3). For example, the cellular UE 14 may be instructed to use a certain transmission mode, e.g. TM9 [refer e.g. to 3GPP TS 36.211 for different transmission modes], and CSI-RS.

When the base station 13 requests a CSI report from the cellular UE 14, the cellular UE 14 will perform measurement operations based on the CSI-RS.

The D2D Tx UE 12 transmits the CSI-RS using the configured parameters (e.g. the CSI-RS pattern (arrows 4 and 5). The cellular UE 14 performs measurements based on the received CSI-RS signal. The D2D Rx UE 15 also performs measurements based on this CSI-RS signal.

The cellular UE 14 transmits a measurement report to the base station 13 (arrow 6). The measurement report reflects the channel from the D2D Tx UE 12 to the cellular UE 14.

The D2D Rx UE 15 also reports its measurements to the base station 13 (arrow 7). The measurement report reflects the channel from the D2D Rx UE 12 to the D2D Tx UE 12.

When implemented in a wireless communication system conforming to 3GPP Rel-10 standard, the above signaling finds full support and is thus fully backwards compatible.

In this embodiment, the base station 13 is muted while the D2D Tx UE 12 transmits the CSI-RS, i.e. during the interference measurement interval. This may cause impact on CSI-RS measurements on other cellular UEs in the wireless communication system 10. However, seen as a tradeoff between D2D sub-system performance gain and cellular sub-system performance loss, the impact from base station muting may be compensated by the D2D performance improvement, particularly when the number of D2D devices is large enough, since in that case quite may channel measurement and reports have to be performed.

In the embodiment of FIG. 3, channel quality information about two links, namely the link between the D2D Tx UE 12 and the cellular UE 14 and the link between the D2D Tx UE 12 and the D2D Rx UE 15, are reported to the base station 13.

Figure 4:
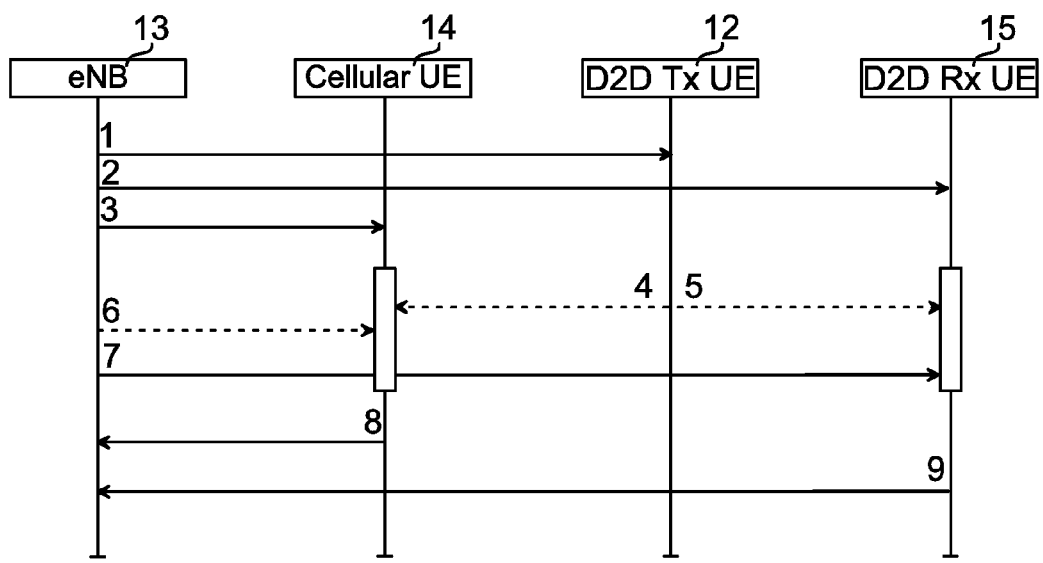
FIG. 4 is a sequence diagram illustrating second exemplary interference channel signaling in a wireless communication system.

FIG. 4 is a sequence diagram illustrating second exemplary interference channel signaling in the wireless communication system 10 of FIG. 2.

The base station 13 signals configuration parameters of Channel State Information—Reference Signals (CSI-RS), e.g. a CSI-RS pattern and time length thereof, to the D2D Tx UE 12 and the D2D Rx UE 15 (arrows 1 and 2). In this embodiment, a first CSI-RS pattern is signaled from the base station 13. Further, the configuration parameters may include instructions about a specific sub-band. In e.g. 3GPP Rel-10, only full-band CSI-RS can be configured.

The base station 13 signals cellular configuration parameters to the cellular UE 14 (arrow 3). For example, the cellular UE 14 may be instructed to use a certain transmission mode, e.g. TM9 [refer e.g. to 3GPP TS 36.211 for different transmission modes], and CSI-RS. In this embodiment, the first CSI-RS pattern as well as a second CSI-RS pattern is signaled from the base station 13. The first CSI-RS pattern will be used by the D2D Tx UE 12 and the second CSI-RS pattern will be used by the base station 13. When the base station 13 requests a CSI report from the cellular UE 14, the cellular UE 14 will perform measurement operations based on both these CSI-RS patterns. The two CSI-RS patterns can be multiplexed in a Time Division Multiplexing (TDM) manner and/or in a Frequency Division Multiplexing (FDM) manner.

The D2D Tx UE 12 transmits the CSI-RS using the configured parameters, in particular using the first CSI-RS pattern (arrows 4 and 5). The cellular UE 14 performs measurements based on this received first CSI-RS signal. The D2D Rx UE 15 also performs measurements based on this first CSI-RS signal.

The base station 13 transmits the CSI-RS using the second CSI-RS pattern (arrows 6 and 7). The cellular UE 14 performs measurements based on the received second CSI-RS signal. The D2D Rx UE 15 also performs measurements based on this second CSI-RS signal.

The cellular UE 14 transmits measurement reports to the base station 13 (arrow 8). A first measurement from the cellular UE 14 report reflects the channel from the D2D Tx UE 12 to the cellular UE 14, based on the first CSI-RS signal using the first CSI-RS pattern. A second measurement report reflects the channel from the base station 13 to the cellular UE 14, based on the second CSI-RS signal using the second CSI-RS pattern.

The D2D Rx UE 15 also reports its measurements to the base station 13 (arrow 9). A first measurement report from the D2D Rx UE 15 reflects the channel from the D2D Tx UE 12 to the D2D Rx UE 15, based on the first CSI-RS signal using the first CSI-RS pattern. A second measurement report reflects the channel from the base station 13 to the D2D Rx UE 15, based on the second CSI-RS signal using the second CSI-RS pattern.

It is noted that this embodiment requires the cellular UE 14 to measure and report on two different CSI-RS patterns.

This embodiment does not require that the base station 13 mutes its CSI-RS signaling during the interference measurement interval, and thus causes no impact on the CSI-RS measurements performed by other cellular UEs in the wireless communication network 10.

In the embodiment of FIG. 4, channel quality information about four links are reported to the base station 13: the link between the D2D Tx UE 12 and the cellular UE 14, the link between the D2D Tx UE 12 and the D2D Rx UE 15, the link between the cellular UE 14 and the base station 13 and the link between the D2D Rx UE 15 and the base station 13.

Figure 5:
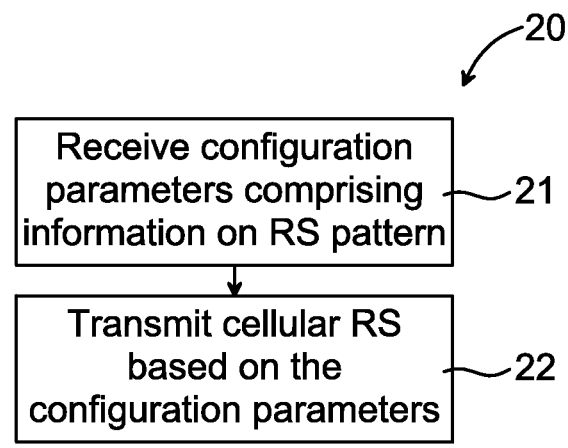
FIG. 5 illustrates a flow chart over steps of a method in a D2D enabled device.

FIG. 5 illustrates a flow chart over steps of a method in a D2D enabled device, such as the D2D Tx UE 12. The method 20 comprises receiving 21, from the base station 13, configuration parameters comprising information on a reference signal pattern for use by the D2D enabled user equipment 12.

The method 20 further comprises transmitting 22, based on the configuration parameters, cellular reference signals, enabling the cellular user equipment 14 to measure and report, to the base station 13, channel information on a channel from the D2D enabled user equipment 12 to the cellular user equipment 14.

In an embodiment, the configuration parameters comprise information on a reference signal pattern used by the base station 13, and wherein the D2D user equipment 12 transmits the cellular reference signals in lieu of the base station 13 (refer also to FIG. 3).

In another embodiment, the configuration parameters comprise information on a reference signal pattern different than a reference signal pattern used by the base station 13. Thereby the D2D user equipment 12 transmits cellular reference signals with a reference signal pattern different than the reference signal pattern used by the base station 13. This enables the cellular user equipment 14 to measure and report to the base station 13 channel information based on two different cellular reference signals (refer also to FIG. 4). In this embodiment, several channels can be measured on and reported about to the base station 13. Firstly, the cellular user equipment may measure and report on two channels: its channel from the D2D enabled user equipment 12 and its channel from the base station 13. Further, the receiving D2D user equipment 15 may also measure and report on two channels: its channel from the D2D enabled user equipment 12 and its channel from the base station 13.

The cellular reference signals may comprise channel state information reference signals, which for example can be dedicated reference signals such as Demodulation Reference Signal (DM-S), or broadcast reference signals, such as Channel State Information Reference Signal (CSI-RS). It is noted that the invention is not restricted to a particular communication protocol, and that the cellular reference signals may differ in different communication systems (e.g. LTE or HSPDA).

Figure 6:
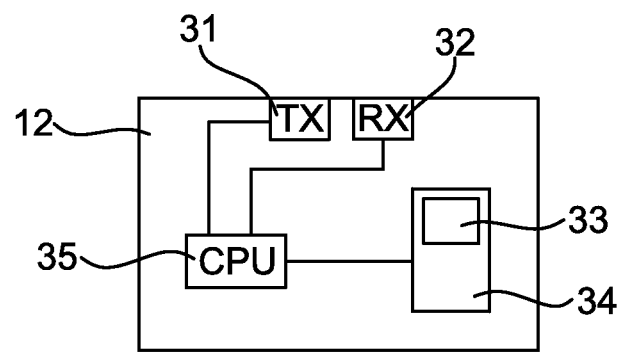
FIG. 6 illustrates an exemplifying D2D enabled device comprising means for implementing embodiments of the methods.

FIG. 6 illustrates an exemplifying D2D enabled device, such as the D2D Tx UE 12, comprising means for implementing embodiments of the methods. The D2D enabled user equipment 12 supports D2D communication with another D2D enabled user equipment 15 and also cellular communication, e.g. with a cellular user equipment 14 unable to support D2D communication. The D2D enabled user equipment 12 comprises a receiver 32 arranged to receive from the base station 13, configuration parameters comprising information on a reference signal pattern for use by the D2D enabled user equipment 12.

The D2D enabled user equipment 12 further comprises a transmitter 31 arranged to transmit, based on the configuration parameters, cellular reference signals, enabling the cellular user equipment 14 to measure and report, to the base station 13, channel information on a channel from the D2D enabled user equipment 12 to the cellular user equipment 14.

The D2D enabled user equipment 12 further comprises a processing device 35 for controlling the transmitter 31 and receiver 32. The processing device 35, e.g. a central processing unit, microcontroller, digital signal processor (DSP), etc., is capable of executing software instructions stored in a computer program product 34 e.g. in the form of a memory. It is noted that although only one processing device 35 is illustrated in FIG. 6, the implementation may comprise distributed hardware so that several Central Processing Units (CPUs) are used rather than one when running the software.

The described methods and algorithms or parts thereof for use in interference measuring and reporting may be implemented e.g. by software and/or application specific integrated circuits in the processing device 35. To this end, the D2D enabled user equipment 12 may further comprise the computer program 33 stored on a computer program product 34.

With reference still to FIG. 6, the invention also encompasses the computer program 33 for measuring and reporting channel data. The computer program 33 comprises computer program code which when run on the D2D enabled user equipment 12, and in particular the processing device 35 thereof, causes the D2D enabled user equipment 12 to perform the methods as described.

A computer program product 34 is also provided comprising the computer program 33 and computer readable means on which the computer program 33 is stored. The computer program product 34 may be any combination of read and write memory (RAM) or read only memory (ROM). The computer program product 34 may also comprise persistent storage, which, for example can be any single one or combination of magnetic memory, optical memory, or solid state memory.

Figure 7:
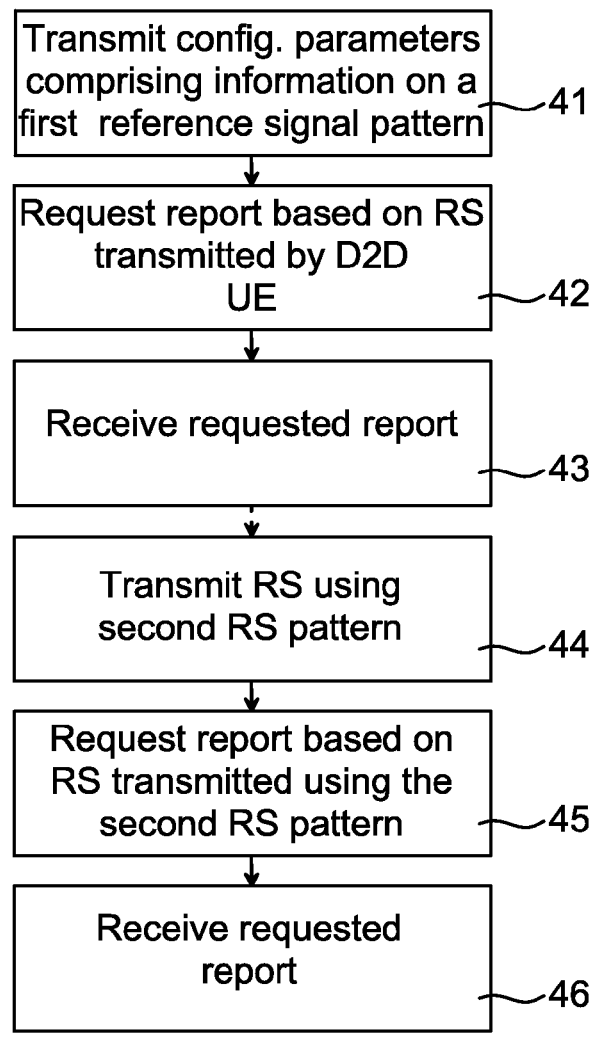
FIG. 7 illustrates a flow chart over steps of a method in a base station.

FIG. 7 illustrates a flow chart over steps of a method in a base station 13 of a communication system 10, as described in relation to FIG. 2. The method 40 comprises transmitting 41, to the D2D enabled user equipment 12, configuration parameters comprising information on a first reference signal pattern for use by the D2D enabled user equipment 12.

The method 40 further comprises requesting 42, from the cellular user equipment 14, a measurement report based on cellular reference signals transmitted by the D2D enabled user equipment 12 using the first reference signal pattern.

The method 40 further comprises receiving 43, from the cellular user equipment 14, measurement reports based on the cellular reference signals transmitted from the D2D enabled user equipment 12, the measurement report comprising channel information on channel from the D2D enabled user equipment 12 to the cellular user equipment 14.

In an embodiment, the method 40 further comprises transmitting 44, to the cellular user equipment 14 reference signals using a second reference signal pattern; requesting 45, from the cellular user equipment 14, a measurement report based on cellular reference signals from the second reference signal pattern; and receiving 46, in response to the requesting, from the cellular user equipment 14 measurement reports on channel from the base station 13 to the cellular user equipment 14 (refer also to FIG. 4).

In an embodiment, the base station 13 utilizes the first reference signal pattern and the method 40 comprises muting reference signal transmissions from the base station 13 using the first reference signal pattern when the D2D enabled user equipment 12 transmits cellular reference signals using the first reference signal pattern (refer also to FIG. 3).

It is noted that steps 44-46, although illustrated in the figure as being performed after completion of step 43, may alternatively be performed concurrently with steps 41-43.

Figure 8:
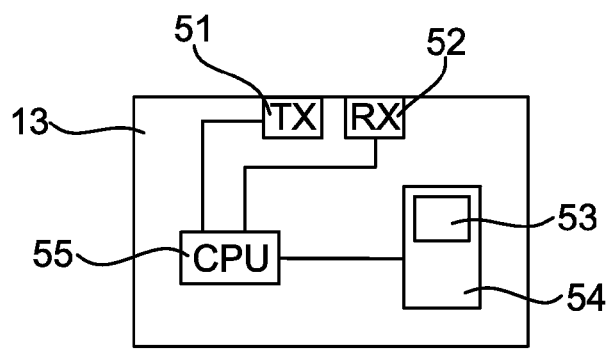
FIG. 8 illustrates an exemplifying base station comprising means for implementing embodiments of the methods.

FIG. 8 illustrates an exemplifying base station 13 comprising means for implementing embodiments of the methods. The base station 13 comprises a transmitter 51 arranged to transmit, to the D2D enabled user equipment 12, configuration parameters comprising information on a first reference signal pattern for use by the D2D enabled user equipment 12.

The base station 13 further comprises a processor 55 arranged to request, from the cellular user equipment 14, a measurement report based on cellular reference signals transmitted by the D2D enabled user equipment 12 using the first reference signal pattern.

The base station 13 further comprises a receiver 52 arranged to receive, from the cellular user equipment 14 measurement reports based on the cellular reference signals transmitted from the D2D enabled user equipment 12, the measurement report comprising channel information on channel from the D2D enabled user equipment 12 to the cellular user equipment 14.

The D2D enabled user equipment 12 further comprises a processor 55 for may e.g. comprise a central processing unit, microcontroller, digital signal processor (DSP), etc., and is capable of executing software instructions stored in a computer program product 54 e.g. in the form of a memory. It is noted that although only one processor 55 is illustrated in FIG. 6, the implementation may comprise distributed hardware so that several CPUs are used rather than one when running the software.

The described methods and algorithms or parts thereof for use in interference measuring and reporting may be implemented e.g. by software and/or application specific integrated circuits in the processor 55. To this end, the base station 13 may further comprise the computer program 53 stored on a computer program product 54.

With reference still to FIG. 8, the invention also encompasses the computer program 53 for measuring and reporting channel data. The computer program 53 comprises computer program code which when run on the base station 13, and in particular the processor 55 thereof, causes the base station 13 to perform the methods as described.

A computer program product 54 is also provided comprising the computer program 53 and computer readable means on which the computer program 53 is stored. The computer program product 54 may be any combination of read and write memory (RAM) or read only memory (ROM). The computer program product 54 may also comprise persistent storage, which, for example can be any single one or combination of magnetic memory, optical memory, or solid state memory.

The invention claimed is:

1. A method in a device-to-device (D2D) enabled user equipment of a communication system, the D2D enabled user equipment supporting D2D communication with another D2D enabled user equipment, the communication system comprising a base station serving one or more cellular user equipment unable to support D2D communication, and wherein the D2D enabled user equipment and the cellular user equipment share the same communication resources, the method comprising:

receiving, from the base station, configuration parameters comprising information on a reference signal pattern for use by the D2D enabled user equipment; and transmitting, based on the configuration parameters, cellular reference signals, enabling the cellular user equipment to measure and report, to the base station, channel information on a channel from the D2D enabled user equipment to the cellular user equipment;

wherein the configuration parameters comprise information on a reference signal pattern used by the base station, and wherein the D2D user equipment transmits the cellular reference signals in lieu of the base station.

2. The method as claimed in claim 1, wherein the cellular reference signals comprise channel state information reference signals, dedicated reference signals, or broadcast reference signals.

3. A device-to-device (D2D) enabled user equipment, the D2D enabled user equipment supporting D2D communication with another D2D enabled user equipment in a communication system comprising a base station serving one or more cellular user equipment unable to support D2D communication, and wherein the D2D enabled user equipment and the cellular user equipment share the same communication resources, the D2D enabled user equipment comprising:

a receiver arranged to receive, from the base station, configuration parameters comprising information on a reference signal pattern for use by the D2D enabled user equipment, and a transmitter arranged to transmit, based on the configuration parameters, cellular reference signals, enabling the cellular user equipment to measure and report, to the base station, channel information on a channel from the D2D enabled user equipment to the cellular user equipment;

wherein the configuration parameters comprise information on a reference signal pattern used by the base station, and wherein the D2D user equipment transmits the cellular reference signals in lieu of the base station.

4. A non-transitory computer-readable medium storing a computer program for a device-to-device (D2D) enabled user equipment, the D2D enabled user equipment supporting D2D communication with another D2D enabled user equipment, in a communication system comprising a base station serving one or more cellular user equipment unable to support D2D communication, and wherein the D2D enabled user equipment and the cellular user equipment share the same communication resources, the computer program comprising computer program code, which, when run on the D2D enabled user equipment, configures the D2D enabled user equipment to:
- receive, from the base station, configuration parameters comprising information on a reference signal pattern for use by the D2D enabled user equipment; and
- transmit, based on the configuration parameters, cellular reference signals, enabling the cellular user equipment to measure and report to the base station channel information on a channel from the D2D enabled user equipment to the cellular user equipment;
- wherein the configuration parameters comprise information on a reference signal pattern used by the base station, and wherein the D2D user equipment transmits the cellular reference signals in lieu of the base station.

5. A method in a base station of a communication system, the communication system comprising a Device-to-Device (D2D) enabled user equipment supporting D2D communication with another D2D enabled user equipment, and one or more cellular user equipment unable to support D2D communication, and wherein the D2D enabled user equipment and the cellular user equipment share the same communication resources, the method comprising:
- transmitting, to the D2D enabled user equipment, configuration parameters comprising information on a first reference signal pattern for use by the D2D enabled user equipment;
- requesting, from the cellular user equipment, a measurement report based on cellular reference signals transmitted by the D2D enabled user equipment using the first reference signal pattern; and
- receiving, from the cellular user equipment, measurement reports based on the cellular reference signals transmitted from the D2D enabled user equipment, the measurement report comprising channel information on channel from the D2D enabled user equipment to the cellular user equipment;
- wherein the base station utilizes the first reference signal pattern, and
- wherein the method comprises muting reference signal transmissions from the base station using the first reference signal pattern, when the D2D enabled user equipment transmits cellular reference signals using the first reference signal pattern.

6. The method as claimed in claim 5, comprising:
- transmitting, to the cellular user equipment reference signals using a second reference signal pattern;
- requesting, from the cellular user equipment, a measurement report based on cellular reference signals from the second reference signal pattern; and
- receiving, in response to the requesting, from the cellular user equipment measurement reports on channel from the base station to the cellular user equipment.

7. A base station for use in a communication system, the communication system comprising a Device-to-Device (D2D) enabled user equipment supporting D2D communication with another D2D enabled user equipment, and one or more cellular user equipment unable to support D2D communication, and wherein the D2D enabled user equipment and the cellular user equipment share the same communication resources, the base station comprising:
- a transmitter arranged to transmit, to the D2D enabled user equipment, configuration parameters comprising information on a first reference signal pattern for use by the D2D enabled user equipment;
- a processor arranged to request, from the cellular user equipment, a measurement report based on cellular reference signals transmitted by the D2D enabled user equipment using the first reference signal pattern; and
- a receiver arranged to receive, from the cellular user equipment measurement reports based on the cellular reference signals transmitted from the D2D enabled user equipment, the measurement report comprising channel information on channel from the D2D enabled user equipment to the cellular user equipment;
- wherein the base station is configured to utilize the first reference signal pattern, and
- wherein the base station is configured to mute reference signal transmissions from the base station using the first reference signal pattern, when the D2D enabled user equipment transmits cellular reference signals using the first reference signal pattern.

8. A non-transitory computer-readable medium storing a computer program for use in a base station of a communication system, the communication system comprising a D2D enabled user equipment supporting D2D communication with another D2D enabled user equipment, and one or more cellular user equipment unable to support D2D communication, and wherein the D2D enabled user equipment and the cellular user equipment share the same communication resources, and wherein the computer program comprising computer program code, which, when run on the base station, configures the base station to:
- transmit, to the D2D enabled user equipment, configuration parameters comprising information on a first reference signal pattern for use by the D2D enabled user equipment;
- request, from the cellular user equipment, a measurement report based on cellular reference signals transmitted by the D2D enabled user equipment using the first reference signal pattern; and
- receive, from the cellular user equipment measurement reports based on the cellular reference signals transmitted from the D2D enabled user equipment, the measurement report comprising channel information on channel from the D2D enabled user equipment to the cellular user equipment;
- wherein the base station is configured to utilize the first reference signal pattern, and
- wherein the base station is configured to mute reference signal transmissions from the base station using the first reference signal pattern, when the D2D enabled user equipment transmits cellular reference signals using the first reference signal pattern.

* * * * *